United States Patent

[11] 3,622,765

[72] Inventor Weston A. Anderson
Palo Alto, Calif.
[21] Appl. No. 837,021
[22] Filed June 27, 1969
[45] Patented Nov. 23, 1971
[73] Assignee Varian Associates
Palo Alto, Calif.

[54] METHOD AND APPARATUS FOR ENSEMBLE AVERAGING REPETITIVE SIGNALS
10 Claims, 10 Drawing Figs.

[52] U.S. Cl. .......... 235/151.3, 235/150.5, 324/0.5
[51] Int. Cl. .......... G06f 7/38, G06j 1/00
[50] Field of Search .......... 235/150.1, 150.5, 151.3; 340/347

[56] References Cited

UNITED STATES PATENTS 3,320,605 5/1967 Reeves .......... 340/347 AD

*Primary Examiner*—Malcolm A. Morrison
*Assistant Examiner*—R. Stephen Dildine, Jr.
*Attorneys*—Stanley Z. Cole and Leon F. Herbert

ABSTRACT: A spectrometer or similar device is scanned repetitively to produce a series of repetitive output signals either of analog or digital form. Each output signal includes an ensemble of time-displaced components and is identical to the other output signals except for noise. The series of output signals is ensemble averaged (time averaged) by an ensambled-averaging digital computer which scans each output signal of the series and samples each output signal at a plurality of sampling points at the same relative position in each output ensemble. Digital data for each sampling point is accumulated in a separate channel of the memory to improve the signal-to-noise ratio. An extra bit is added into the sampled data for each sampling point, such added bit being less than the least significant bit to be stored in the memory. The accumulation of added bits of each sampling point, over a series of scans, adds to zero to some number which is the same for each sampling point, whereby the digitization error is reduced.

INVENTOR.
WESTON A. ANDERSON
BY Stanley Z. Cole
ATTORNEY

INVENTOR
WESTON A. ANDERSON

BY Stanley Z. Cole
ATTORNEY

METHOD AND APPARATUS FOR ENSEMBLE AVERAGING REPETITIVE SIGNALS

DESCRIPTION OF THE PRIOR ART

Heretofore, spectrometers have employed a time-averaging computer for time averaging the repetitive output signal over many scans to provide improved signal-to-noise ratio. Such a spectrometer is disclosed and claimed in U.S. Pat. application Ser. No. 459,006 filed May 26, 1965 now U.S. Pat. No. 3,475,680 and assigned to the same assignee as the present invention. Time averaging of repetitive signals whether of an analog or digital form is more aptly described as "ensemble averaging" since such signals comprise an ensemble of time-displaced peaks or components and these peaks or components of the ensemble are sampled and accumulated over many scans of the repetitive signal. Therefore, the term ensemble averaging will be used herein in place of the prior art term "time averaging." The problem with the prior ensemble-averaging arrangement is that if the digitization error is to be kept to a reasonable value over many scans, as of 1,000, a relatively high number of digitization bits must be employed, as of 10 bits. Then if the repetitive signal is to be scanned 8,000 times the capacity of each memory channel is on the order of 24 bits. This then becomes a relatively large and expensive memory. It would be desirable to reduce the capacity of the memory by reducing the number of digitization bits while somehow avoiding the resultant digitization error.

SUMMARY OF THE PRESENT INVENTION

The principal object of the present invention is the provision of an improved method and apparatus for ensemble averaging of repetitive signals.

One feature of the present invention is the provision of adding an extra bit, which is less than the least significant bit that is to be stored in the memory, into each of the digitized numbers for digitized sampled points of the repetitive signal, and quantizing the number of added extra bits over a series of scans for each sampling point such that on the average the sum of the extra bits for every sampling point adds to zero or to the same number, whereby the digitization error is substantially reduced.

Another feature of the present invention is the same as the preceding feature wherein the repetitive signal is an analog signal and the extra added bit is in analog form and added to the analog signal, to be ensemble averaged, before digitization of the analog signal.

Another feature of the present invention is the same as the first feature wherein the extra added bit is a digital bit added to the digital numbers of the repetitive signal.

Another feature of the present invention is the same as the immediate preceding feature wherein the extra digital bits added to the digitized number for a given sampling point is incremented by one for each successive scan through $m$ scans and wherein the $m$ least significant numbers are discarded from each of the resultant numbers before such resultant numbers are accumulated in the proper memory location.

Another feature of the present invention is the same as any one or more of the preceding features wherein the analog signal to be time averaged is a gyromagnetic resonance signal derived from the output of gyromagnetic resonance spectrometer.

Other features and advantages of the present invention will become apparent upon a perusal of the following specification taken in connection with the accompanying drawings wherein:

DESCRIPTION OF THE PREFERRED EMBODIMENTS

Figure 1:
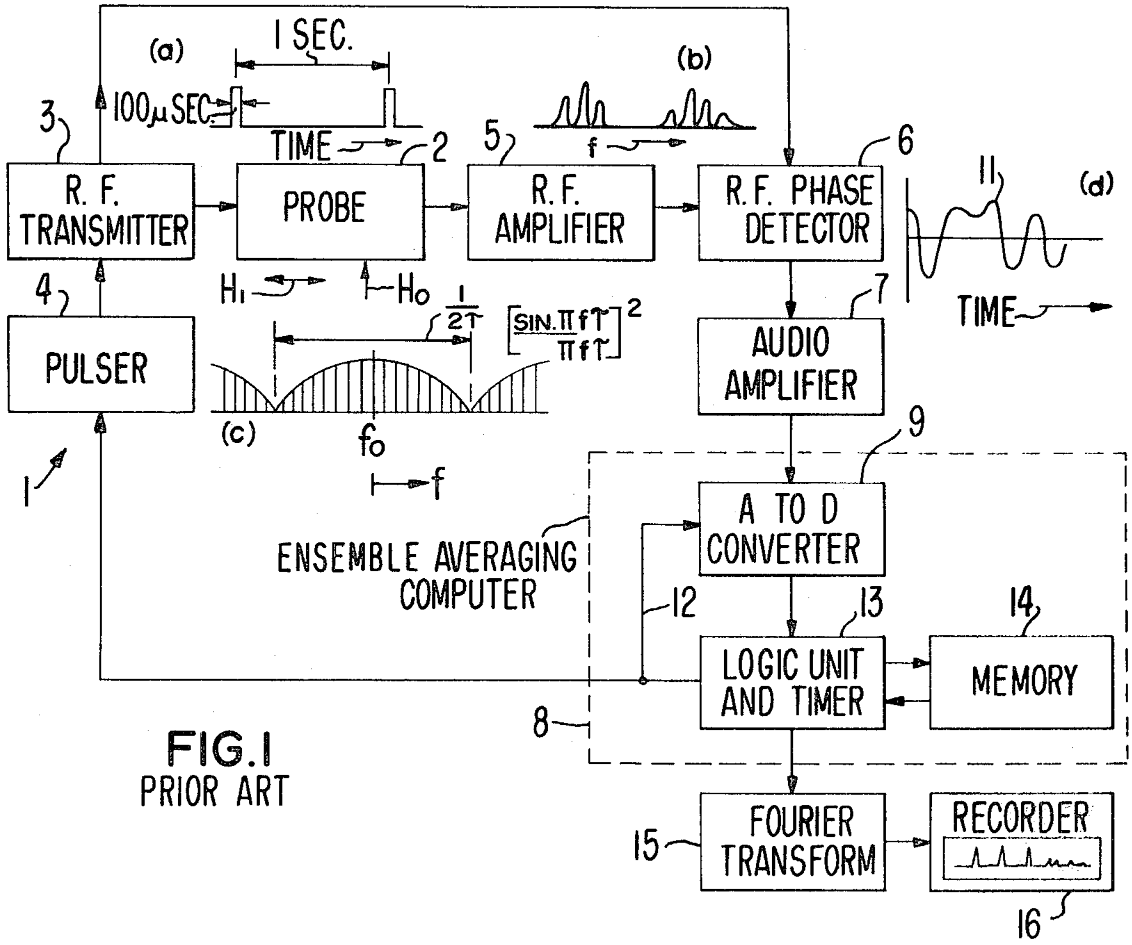
FIG.1 PRIOR ART
FIG. 1 is a schematic block diagram of a prior art gyromagnetic resonance spectrometer employing prior art time averaging of the resonance signal.

Referring now to FIG. 1 there is shown a prior art gyromagnetic resonance spectrometer 1 employing a prior art ensemble-averaging computer for ensemble averaging the output resonance signal of the spectrometer. Briefly, the spectrometer 1 includes a sample probe 2 disposed in a polarizing magnetic field $H_0$ for immersing a sample of matter to be investigated in the polarizing magnetic field. A radiofrequency transmitter 3, as pulsed by a pulser 4, supplies bursts of radiofrequency energy to the probe 2 and sample [see waveform ($a$)] for exciting impulse gyromagnetic resonance of the spectral lines of the sample [see waveform ($b$)].

More specifically, the bursts of RF energy are of short duration $\tau$, as of 100 microseconds with a relatively long period T, as of 1 sec. duration, to produce a $$\left[\frac{\text{Sin } \pi f\tau}{\pi f\tau}\right]^2$$

distribution of the transmitter energy with spectral line spacing of approximately 1 Hz. which covers the expected bandwidth of the spectrum to be excited [see waveform ($c$)]. In this manner, all the spectral lines of the sample to be investigated are excited into resonance simultaneously.

The composite resonance signal emanating from the sample is picked up by a receiver coil in the probe 2 and fed to a radiofrequency amplifier 5 wherein it is amplified and thence fed to one input of a radiofrequency phase detector 6 for detection against a reference sample of the transmitted signal to produce an audiofrequency composite resonance signal. The composite audiofrequency resonance signal, having an envelope as depicted in waveform ($d$), is amplified by audio amplifier 7 and fed to an ensemble averaging computer 8. The computer 8 has an analog-to-digital converter 9 for time scanning the resonance signal envelope after each transmitter pulse and for sampling the signal amplitude at a certain set of time-displaced sampling points for each scan of the resonance signal and converting the sampled analog signal amplitude into digital numbers. The sampling points are indicated by the solid dots on the signal amplitude curve 11 of FIG. 2 and are synchronized with the transmitter pulses via an output 12 derived from the logic and timer unit 13 of the time averaging computer 8.

The digitized number, for each sampling point, is added to the contents of a memory channel of a memory 14, such contents being representative of the sum of previously obtained digital numbers for a given sampling point, as derived from previous scans of the analog resonance signal. The updated summation number is stored in the same memory channel as a replacement summation number. After a certain number of ensemble-averaging scans of the composite resonance signal, the ensemble-averaged summation numbers are read out of the respective memory channels into a Fourier transform unit 15 wherein they are Fourier transformed from the time domain into the frequency domain to obtain an ensemble-averaged resonance spectrum output which is fed to an X-Y recorder 16 for recording in the conventional manner.

Figure 2:
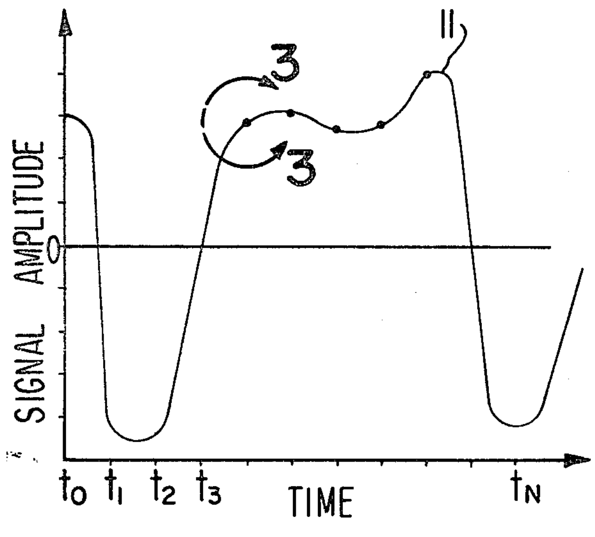
FIG. 2 is a plot of signal amplitude versus time depicting the analog signal sampling points to be digitized for each scan of the resonance signal.
Figure 3:
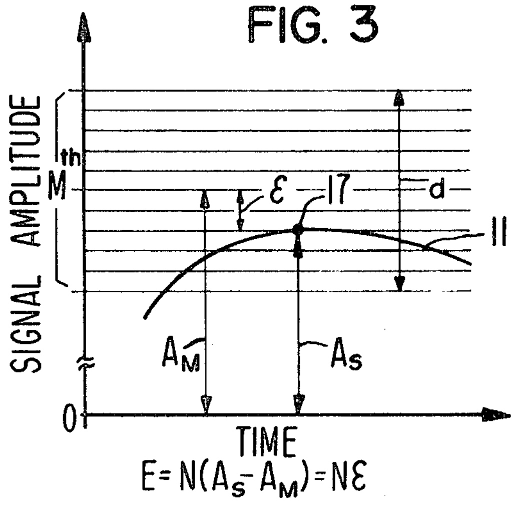
FIG. 3 is a magnified portion of the plot of FIG. 2 delineated by line 3—3.

Referring now to FIG. 3, there is shown a magnified portion of the analog signal waveform of FIG. 2 and depicting one sampling point 17 on the analog curve 11. Sampling point 17 falls within the $M^{th}$ digitizing bit such that the digitized amplitude $A_M$ of the signal at the sampling point 17 is the product $Md$, where $d$ is the value of analog voltage corresponding to one digitizing bit $d$. The true signal amplitude is $A_s$ and the digitizing error is $\epsilon$, namely, $(A_s-A_M)$. The cumulative digitizing error E, after N scans, is given by the product $N\epsilon$. The digitizing error can be reduced by increasing the number of digitizing bits but this requires a substantial increase in the capacity of the memory and is to be avoided if possible.

In order to avoid digitization errors from building up it is desirable that the size of the least significant bit to be added to the accumulated total in a respective channel be comparable to the noise level. The number of bits needed in each channel is then determined by the size of the largest signal to be digitized and the number of scans. For example, if the size of the largest signal is 1,000 times the noise level and if it were desired to scan 4,000 times to improve the signal-to-noise ratio, then each channel of the memory would need to be 22 bits or more. This then becomes a relatively large and expensive memory. It would be desirable to reduce the capacity of the memory by reducing the number of bits to be stored. From a theoretical viewpoint only about 16 bits of storage are needed in the above example to provide sufficient resolution to obtain the maximum allowed signal-to-noise ratio.

According to the present invention the digitizing error is substantially reduced for a given number of available digitizing bits by adding an extra bit into each of the measured digitizing bit numbers, such extra bit being either positive, negative or zero and being of a magnitude less than the least significant bit $d$. The extra bits can be either analog or digital, the former being added to the analog signal before digitization, whereas the digital extra bits are added to the digitized numbers for the respective sampling points. A certain number of the extra bits are added over a series of scans for each sampling point such that on the average the sum of the extra bits added for the same measuring point adds to substantially zero or to some finite number which is the same for all other measuring points. In this manner, the added extra bits serve to substantially reduce the digitization error, thereby permitting use of a smaller memory capacity for a given signal-to-noise ratio. The extra bits can be added by any one of several ways as further described below with reference to FIGS. 4–10.

Figure 4:
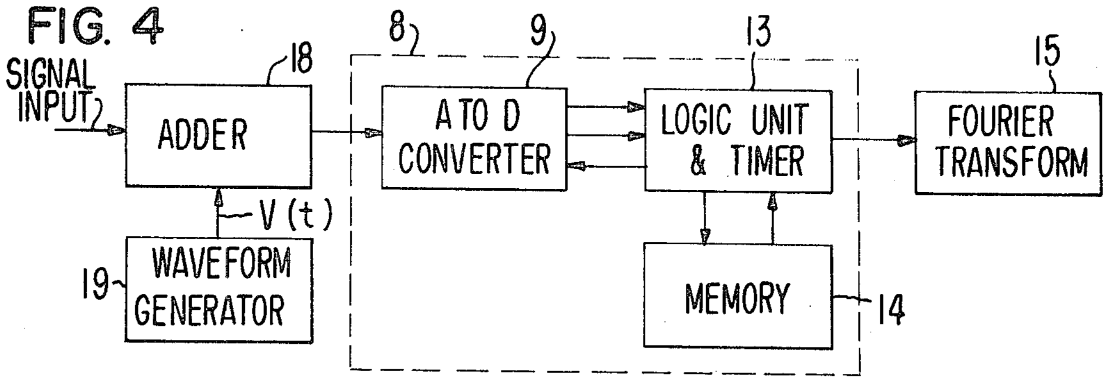
FIG. 4 is a schematic block diagram for an ensemble-averaging computer incorporating features of the present invention.
Figure 5:
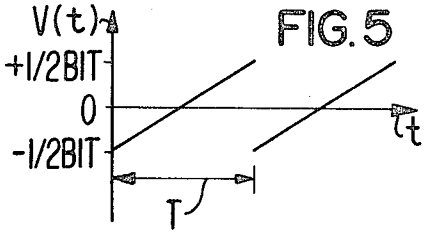
FIGS. 5 and 6 are plots of alternative voltage waveforms to be employed in the circuit of FIG. 4.
Figure 6:
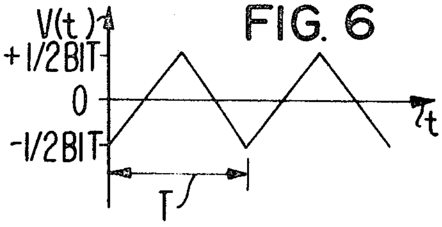

Referring now to FIGS. 4–6, there is shown a method and apparatus for adding the extra bits to reduce the digitization error. More specifically, the input analog signal from audio amplifier 7 of FIG. 1 is fed to an adder 18 of FIG. 4 wherein a slowly varying ramp voltage waveform of FIG. 5, or a sawtooth waveform of FIG. 6, as derived from a waveform generator 19, is added to the analog signal before digitization in the computer 8, as aforedescribed. The waveform to be added to the input signal 11 preferably has a peak-to-peak amplitude corresponding to the voltage needed to change the analog-to-digital converter 9 by one bit, i.e., equal to the least significant bit $d$. The ramp and sawtooth waveforms have an average value of zero. The period T of the waveform is made to be long compared to the time lapse between sampling points of time for a given sampling point in successive scans, i.e., the period of the waveform is large compared to the period for a single scan of the resonance signal 11. The period T is also made equal to or shorter than the duration time of the experiment so that during the course of the experiment many different values of $V(t)$ are obtained. In this manner, the number of added bits is quantized such that the sum of the extra analog bits added for the same measuring point in successive scans, over a series of scans, adds to substantially zero (averages out).

Figure 7:
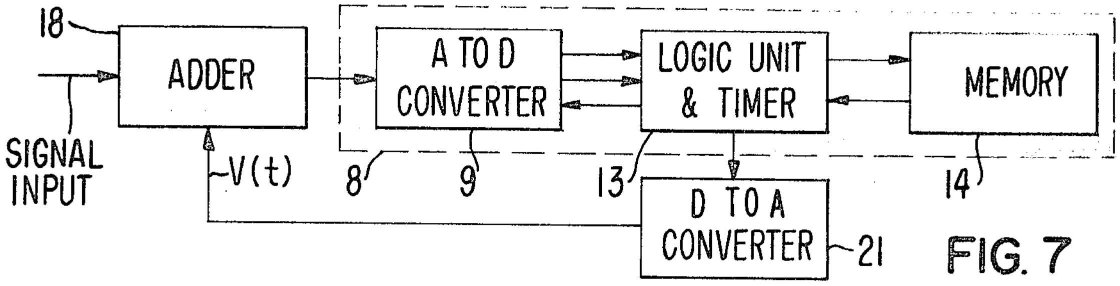
FIG. 7 is a schematic block diagram for an ensemble-averaging computer incorporating alternative features of the present invention.
Figure 8:
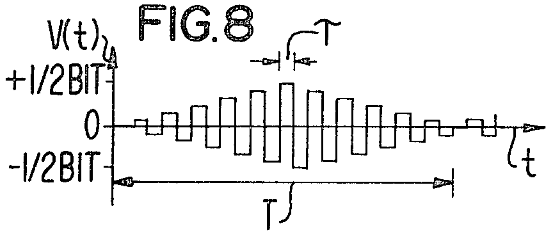
FIGS. 8 and 9 are plots of alternative voltage waveforms to be employed in the circuit of FIG. 7.
Figure 9:
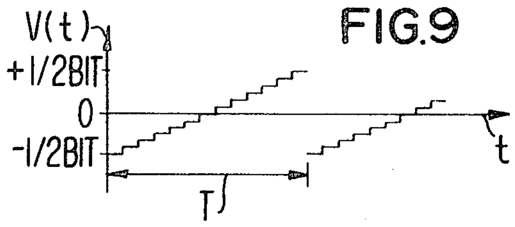

Referring now to FIGS. 7–9, there is shown an alternative method and apparatus for adding the extra analog bits before digitization of the analog signal to substantially remove the digitization error. More specifically, the apparatus and method is substantially the same as that of FIGS. 4–6 with the exception that waveform generator 19 is replaced by a digital-to-analog converter 21 controlled by the logic unit 13 of the computer 8. The digital-to-analog converter 21 generates the alternative waveforms of FIGS. 8 or 9, such waveforms being characterized by being stepped or incremented in a series of voltages all less than ±½ the least significant bit $d$ in amplitude. Again the period T of the waveform is long compared to the sampling rate and comparable to or less than the period of the experiment such that the added analog voltages sum to zero so they do not contribute an error or offset to the sum stored in the memory channels.

Figure 10:
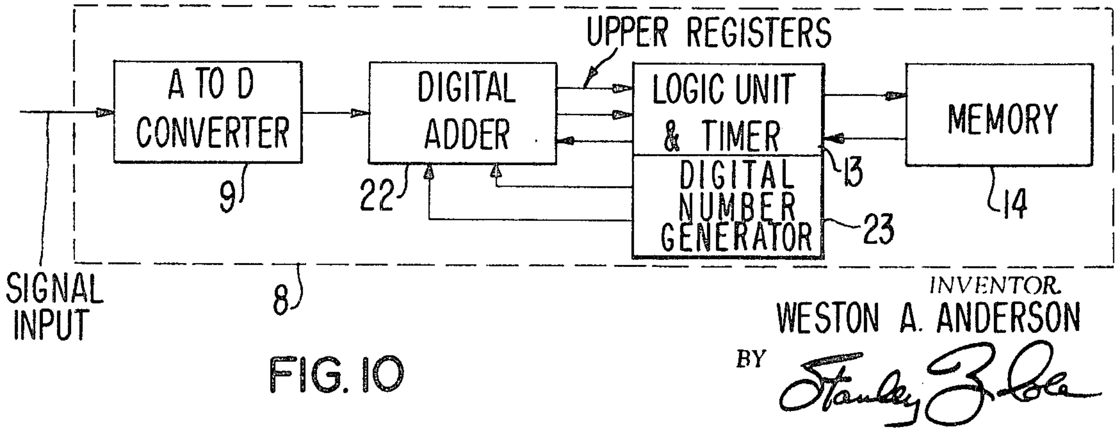
FIG. 10 is a schematic block diagram of an ensemble-averaging computer employing alternative features of the present invention.

Referring now to FIG. 10, there is shown an alternative method and apparatus of the present invention wherein the extra bits are digital bits added after digitization of the analog input signal. More specifically, the computer 8 is essentially the same as that of FIG. 4 with the exception that the analog adder is replaced by a digital adder 22 connected to the output of the analog-to-digital converter 9. In addition, the waveform generator 19 is replaced by a digital number generator or counter 23 controlled by the logic unit 13 and feeding the output digital numbers to the digital adder 22 to be added to the digitized numbers derived by digitizing the analog signal at the sampling points. The digitized output of the analog-to-digital converter 9 is placed in the adder 22 and a binary number generated by the digital number generator 23 is added to the $m$ lower registers of the adder 22. After each scan of the analog signal, the counter 23 is incremented by one bit, which is less than the least significant bit that is outputted to the logic unit 13. Only the $m+1$ and higher registers of the adder 22 are coupled back to the logic unit 13 where they are then added to the contents of the memory 14 in the manner as aforedescribed. By not coupling the registers of the counter to the logic which are lower than $m+1$ the $m$ least significant bits of the resultant number, obtained by adding the extra bit to the digitized number, are discarded. The fact that a positive or negative carry bit is incremented into the $m+1$ register from the $m$ register on the average of $N(A_s-A_M)/d$ times during the duration of the experiment just compensates for the digitization error.

Although a counter which is incremented by one count after each scan can be used to produce the $m$ bits of the digital number generator 23, a counter with the bits inverted, as described below in the table of digital numbers offers the advantage of providing the averaging of the digitization error without knowing in advance the number of scans. The bits in this alternative counter 23 are inverted so that the least significant bit, i.e., the $m^{th}$ bit, is incremented on every scan, while the $m-1$ bit is incremented every second scan, and the $m-n$ bit is incremented every $2^n$ scan. An example of such a sequence is given in the following table.

TABLE OF EXTRA ADDED DIGITAL BITS LESS THAN THE LEAST SIGNIFICANT BIT OF THE NUMBER TO BE ADDED TO THE ACCUMULATION

| Scan | m | m−1 | m−2 | m−3 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| . | . | . | . | . |
| . | . | . | . | . |
| . | . | . | . | . |
| 15 | 1 | 1 | 1 | 1 |

As an alternative to the computer hardware of FIG. 10 the same result can be achieved by proper programming of a general purpose computer to perform essentially the same functions performed by the computer hardware of FIG. 10. More specifically, one of the counters in the general purpose computer is cycled through $m$ bits and these $m$ bits are added either in normal or inverted order to the binary number from the analog-to-digital converter 9. A shift operation is then performed so that the $m$ least significant bits are discarded. The resultant digital number is then added to the contents of the proper memory location (channel) to obtain a replacement summation number which is stored in the same memory location (channel) as an updated summation number.

As used herein "adding" is considered to encompass subtracting since subtraction can be considered as addition of a number having a negative sign.

Thus far in the specification, the method and apparatus of the present invention has been shown as employed for ensemble averaging repetitive analog signals derived from a gyromagnetic resonance spectrometer. However, the present invention is applicable in general to ensemble-averaging repetitive signals either of analog or digital form. For example, the present invention may be employed to advantage for ensemble-averaging repetitive output signals derived from mass spectrometers, induced electron emission spectrometers, infrared spectrometers, gas or liquid chromatographs, cyclotron resonance spectrometers, radio frequency spectrometers, etc. As used herein "repetitive signals" is defined to means signals which are repeated identically except for noise and other unwanted fluctuations, such signals may be transient or may be continuous.

Although the preferred embodiment of the present invention quantize the number of added extra bits at each sampling point over the many scans such that the total sum of the added extra bits adds to zero for each sampling point this is not a requirement. The requirement is that the sum of the added extra bits for each sampling point should add to the same number for all sampling points. In the preferred embodiment, this same number is zero such that no offset is obtained in the base line. If the same number is not zero, some offset is obtained for the base line. In many cases, base line offset is not troublesome or can be readily corrected.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method of ensemble averaging a repetitive input signal the steps of, repetitively scanning the input signal, sampling the scanned signal amplitude at a certain same set of predetermined displaced points on each scan of the signal to obtain a corresponding measured digital bit number for each sampled point, such digital bit number having a certain least significant bit to be stored in a multichannel memory and a certain digitization error bit associated therewith, adding an extra bit which is less than the least significant bit into each of the measured digital bit numbers to obtain resultant numbers, quantizing the number of added extra bits over a series of scans for each respective sampling point to a certain same number for each sampling point such that the added extra bits serve to substantially reduce the digitization error, adding the resultant measured digital bit number for each sampled point to a summation digital bit number previously stored in a respective channel of a multichannel memory for the corresponding previously sampled and measured point to obtain a replacement summation number, and storing the replacement summation digital number in the same respective memory channel as an updated summation number for that channel.

2. The method of claim 1, wherein the input signal is an analog signal and the extra bits are representative of another analog signal which is added to the analog signal before the analog signal is sampled and digitized.

3. The method of claim 1 wherein the extra bits are digital bits added to the measured digital bit numbers after the input signal is sampled.

4. The method of claim 3 wherein the certain number of added bits which are added over a series of scans for each respective sampling point is $m$, and including the step of discarding the $m$ least significant numbers for each of the resultant numbers before adding the resultant numbers to the summation numbers previously stored in the memory.

5. In an apparatus for ensemble averaging a repetitive input signal, means for repetitively scanning the input signal, means for sampling the scanned signal amplitude at a certain same set of predetermined displaced points on each scan of the signal, and obtaining a corresponding measured digital bit number for each sampled point, such measured number having a certain least significant bit to be stored in a multichannel memory and a certain digitization error bit associated therewith, means for adding an extra bit which is less than the least significant bit into each of the measured digital bit numbers to obtain resultant numbers, means for quantizing the number of added extra bits over a series of scans for each respective sampling point to a certain number such that on the average the sum of the extra bits added for the same sampling point for that predetermined number of scans adds to substantially the same number for all of the sampling points such that the added extra bits serve to substantially reduce the digitization error, means forming a multichannel memory, second adding means for adding the resultant measured digital bit number for each sampling point to a summation digital bit number previously stored in a respective channel of said memory for the same sampling points to obtain a replacement summation number, and means for storing the replacement summation number in the same respective memory channel as an updated summation number for that channel.

6. The apparatus of claim 5 wherein the input signal is an analog signal, including a means forming a signal generator for generating an analog voltage, and wherein said first adder means adds the generated analog voltage to the analog signal voltage before sampling thereof, and means for converting the sampled analog signal amplitude into digital numbers.

7. The apparatus of claim 6 wherein the peak-to-peak amplitude of the added analog voltage corresponds to the voltage required to change said analog-to-digital converter means by one bit.

8. The apparatus of claim 6 wherein said signal generator means includes a digital-to-analog converter for generating the analog signal from a digital input.

9. The apparatus of claim 5 including means for generating digital numbers as the extra bits to be added into each of the measured digital bit numbers, said extra bit adder means serving to add an extra bit number to each of the measured digital bit numbers to obtain summation numbers, and means for discarding the least significant bit numbers from the summation number to obtain the resultant numbers to be fed to said second adder means.

10. The apparatus of claim 5 including means forming a spectrometer for generating the repetitive signal to be ensemble averaged.

* * * * *